US008434896B1

(12) United States Patent
Embry

(10) Patent No.: US 8,434,896 B1
(45) Date of Patent: May 7, 2013

(54) UNDER-BED MOUNTED NIGHT LIGHT

(76) Inventor: David R. Embry, Kennesaw, GA (US)

( * ) Notice: Subject to any disclaimer, the term of this patent is extended or adjusted under 35 U.S.C. 154(b) by 430 days.

(21) Appl. No.: 12/765,209

(22) Filed: Apr. 22, 2010

(51) Int. Cl.
*F21S 4/00* (2006.01)
*F21V 21/00* (2006.01)
*F21V 3/00* (2006.01)
*F16B 47/00* (2006.01)

(52) U.S. Cl.
USPC .................. 362/249.02; 248/205.3; 248/683; 362/130; 362/801

(58) Field of Classification Search ... 5/905; 297/217.6; 362/127–134, 249.01–249.09, 249.14, 249.16, 362/641, 801; 248/205.3, 205.4, 683
See application file for complete search history.

(56) References Cited

U.S. PATENT DOCUMENTS

| | | | | | |
|---|---|---|---|---|---|
| 4,173,035 | A | * | 10/1979 | Hoyt | 362/249.04 |
| 4,297,546 | A | * | 10/1981 | Koch | 200/38 R |
| 4,544,993 | A | | 10/1985 | Kirk | |
| 5,019,950 | A | | 5/1991 | Johnson | |
| 5,495,147 | A | | 2/1996 | Lanzisera | |
| 6,461,019 | B1 | | 10/2002 | Allen | |
| 6,505,956 | B1 | * | 1/2003 | Priddy et al. | 362/249.04 |
| 6,595,654 | B2 | | 7/2003 | Washburn | |
| 6,955,448 | B1 | | 10/2005 | Lefferson | |
| 6,965,205 | B2 | | 11/2005 | Piepgras et al. | |
| 2005/0278848 | A1 | * | 12/2005 | Polevoy et al. | 5/201 |

* cited by examiner

*Primary Examiner* — Nimeshkumar Patel
*Assistant Examiner* — Steven Horikoshi
(74) *Attorney, Agent, or Firm* — Montgomery Patent & Design; Robert C. Montgomery

(57) ABSTRACT

An under-bed mounted accent lighting apparatus comprises a series of lamps which automatically illuminate to cast a soft glow from underneath the bed is herein disclosed. The lamps are electrically interconnected via standard wiring and adhesively affixed along the bed frame. The lamps are powered by a common user configurable timer module which plugs into a standard wall outlet.

17 Claims, 4 Drawing Sheets

UNDER-BED MOUNTED NIGHT LIGHT

RELATED APPLICATIONS

The present invention was first described in a notarized Official Record of Invention on May 20, 2009, that is on file at the offices of Montgomery Patent and Design, LLC, the entire disclosures of which are incorporated herein by reference.

FIELD OF THE INVENTION

The present invention relates generally to night lights, and in particular, to a lighting assembly particularly adapted for lighting a ground area in the vicinity of an existing bed.

BACKGROUND OF THE INVENTION

Night lights are common household fixtures. Night lights provide a unique utility in that they provide a practical lighting function to a user during nighttime conditions in an indoor setting, provide a comforting and reassuring means to a person who has uneasy feelings associated with nighttime conditions, and provide the light at a low enough level so as not to overtly disturb the sleeping conditions of the user.

While such night lights are indubitably useful, conventional night lights are relegated to operation in the immediate vicinity of their power source, generally a conventional wall outlet. This can make it difficult for a user who wishes to provide a lighting function to certain areas such as the middle of a room or the like without resorting to full power lighting sources such as lamps, ceiling lights, and the like.

Various attempts have been made to provide night light type lighting devices adapted for floor illumination and various other settings. Examples of these attempts can be seen by reference to several U.S. patents. U.S. Pat. No. 4,544,993, issued in the name of Kirk, describes a floor illuminating bedside light unit. The Kirk device takes the form of a conventional floor mat which provides gentle lighting to a surrounding floor area upon activation.

U.S. Pat. No. 6,595,654, issued in the name of Washburn, describes a multifunctional illumination system for furniture which provides a means for incorporating conventional lighting functionality into various items of furniture and the like.

U.S. Pat. No. 6,955,448, issued in the name of Lefferson, describes a night light adapted for use under a bed which provides illumination to a wide angled portion of floor.

While these devices fulfill their respective, particular objectives, each of these references suffer from one (1) or more of the aforementioned disadvantages. Many such devices are not particularly adapted for use in certain desirable applications such as with an existing bed. Also, many such devices do not provide a wide range of adjustability or customizability to a user. Furthermore, many such devices do not provide a simple means of actuation for a user who wishes to selectively operate the device during nighttime conditions or the like. Accordingly, there exists a need for a night light without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a night light assembly which is mountable to an existing bed and automatically activated in order to provide gentle lighting to a ground surface such that a user can safely move about the bed at will during nighttime conditions. Thus, the object of the present invention is to solve the aforementioned disadvantages and provide for this need.

To achieve the above objectives, it is an object of the present invention to provide an accent lighting apparatus mounted along a bed frame in order to provide soft illumination from underneath the bed. The apparatus comprises a plurality of lamps, a timer, wiring, and a plurality of adhesive tabs.

Another object of the present invention is to produce illumination downward to a floor area surrounding the bed to produce enhanced visibility, a romantic effect, comfort for children, and the like. This is achieved via the adhesive tabs, which provide a mounting means for the plurality of lamps to a lower horizontal surface of an existing bed frame.

Yet still another object of the present invention is to allow a user to selectively mount the lamps to the bed via the adhesive tabs. Each tab comprises a length of heat-resistant plastic or paper tape with a release liner and a central aperture. In use, a user removes the liner, places the lamp through the aperture, and simply secures the lamp and tab in a desired location by pressing the tab along a surface of an existing bed frame.

Yet still another object of the present invention is to provide both automatic and manual activation of the lamps via the timer. The timer comprises a conventional timer unit powered by a conventional wall outlet and allowing a user to selectively define desired activation periods of the device over a twenty-four hour period. The timer further comprises a three-mode switch which allows a user to manually turn the device on, turn the device off, or set the invention to follow the timed automatic activation periods.

Yet still another object of the present invention is to provide electrical power via a common household outlet. The wiring comprises conventional electrically connective wiring which connects each lamp in a parallel circuit such that the entire device is powered via a single source and so that the failure of a single lamp does not affect the operation of the other lamps.

Yet still another object of the present invention is to provide a method of utilizing the device that provides a unique means of selectively arranging the plurality of lamps around the frame of an existing bed or the like, powering the assembly via a conventional wall outlet, and automatically or manually providing a soft lighting functionality to a surrounding floor area.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
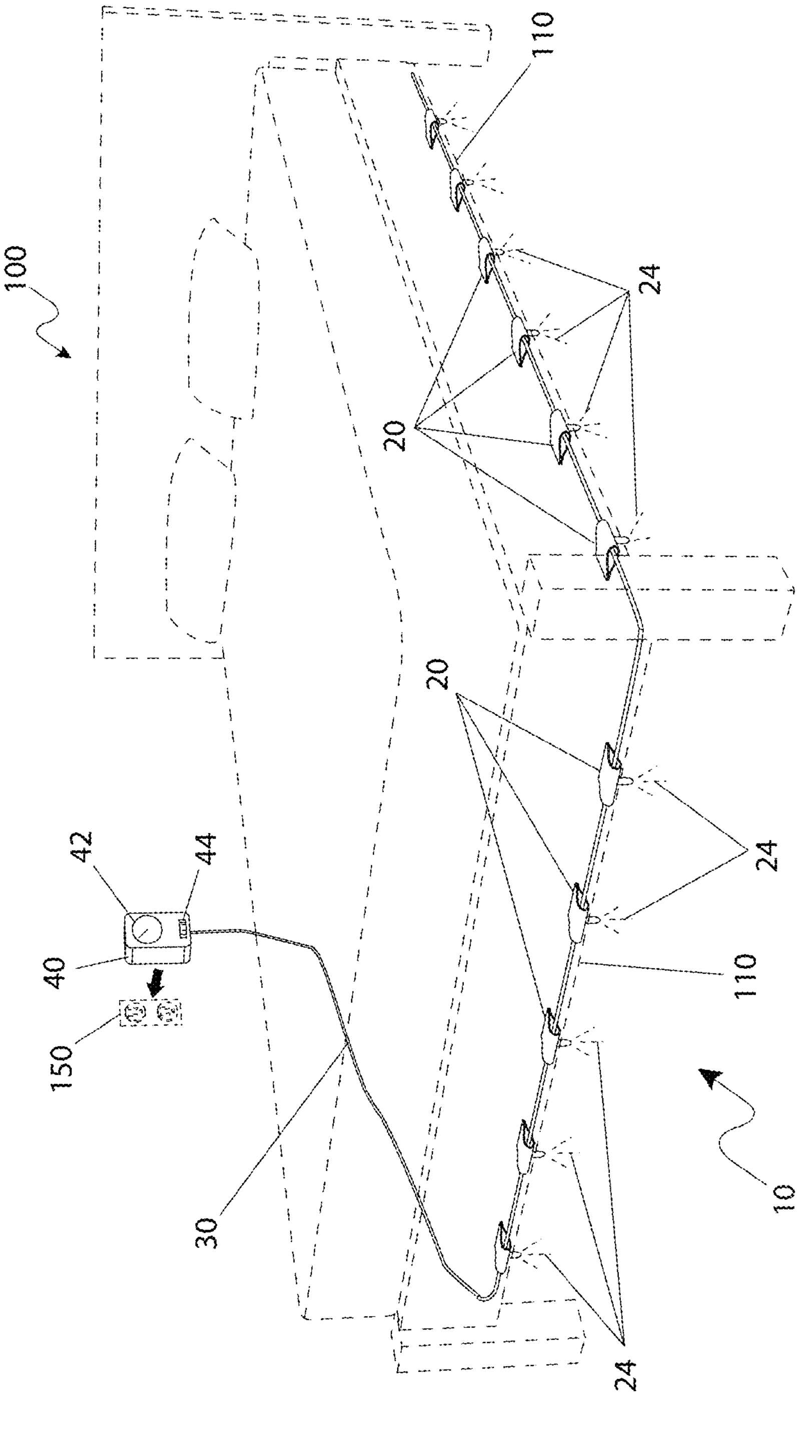
FIG. 1 is an environmental view of an under-bed mounted night light 10, according to a preferred embodiment of the present invention.

10 under-bed mounted night light lamp
21 adhesive tab
22 adhesive layer
23 release liner
24 illumination aperture
30 wiring
40 timer module
41 plug prong
42 dial
44 mode switch
100 bed
110 bed frame
150 electric outlet

DETAILED DESCRIPTION OF THE PREFERRED EMBODIMENT

Figure 2A:
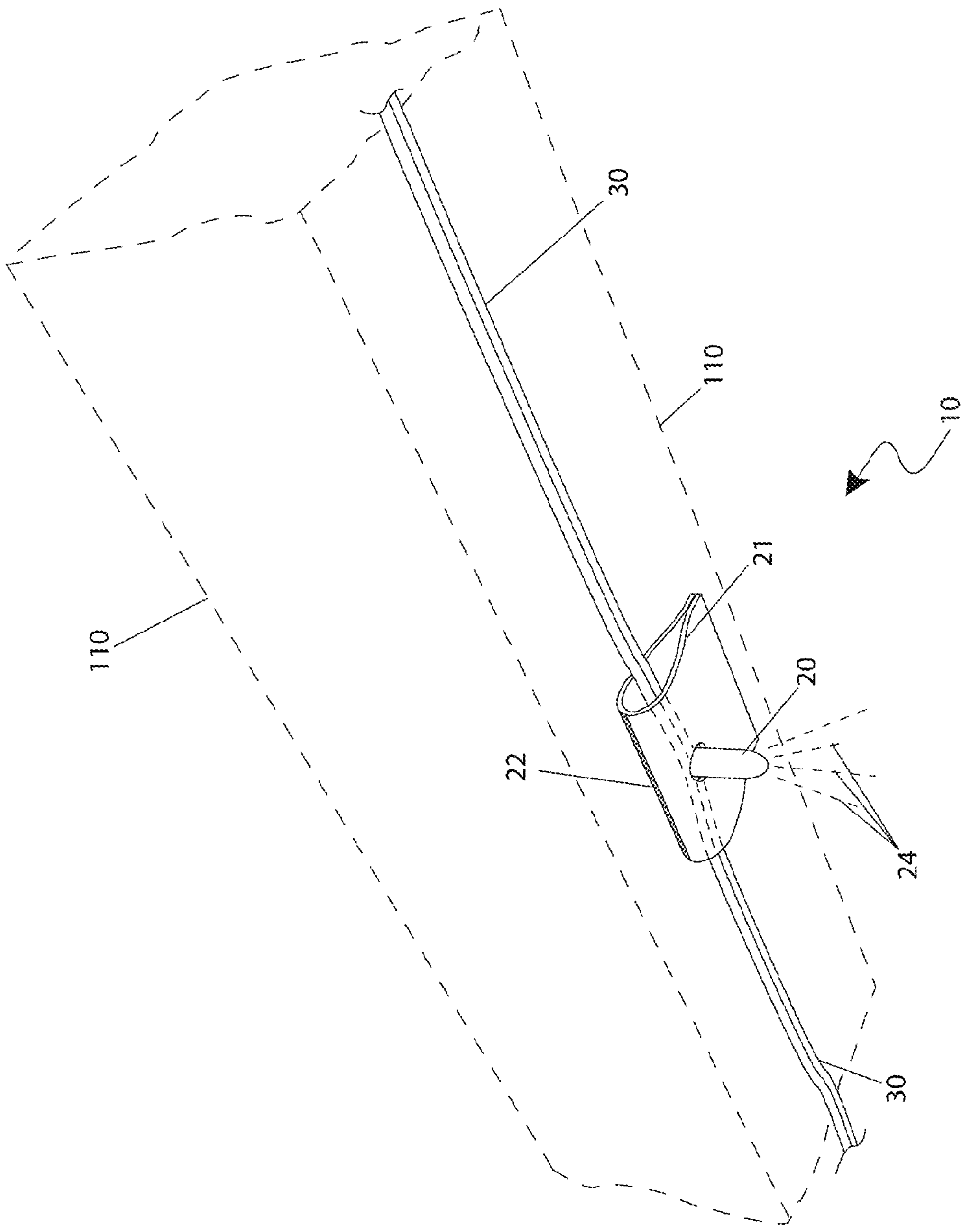
FIG. 2*a* is an environmental view of a lamp portion 20 of the under-bed mounted night light 10, according to a preferred embodiment of the present invention.
Figure 2B:
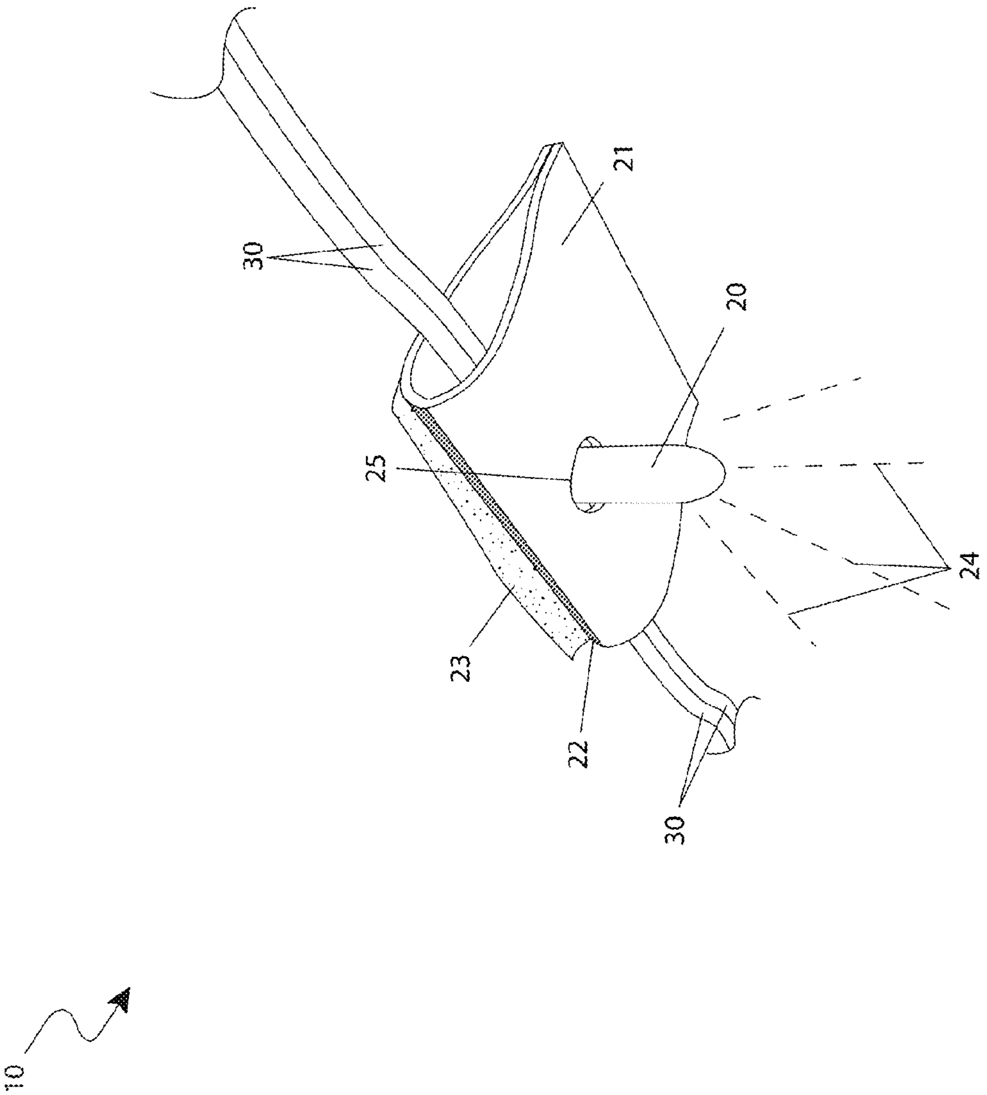
FIG. 2*b* is a close-up view of a lamp portion 20 of the under-bed mounted night light 10, according to a preferred embodiment of the present invention.
Figure 3:
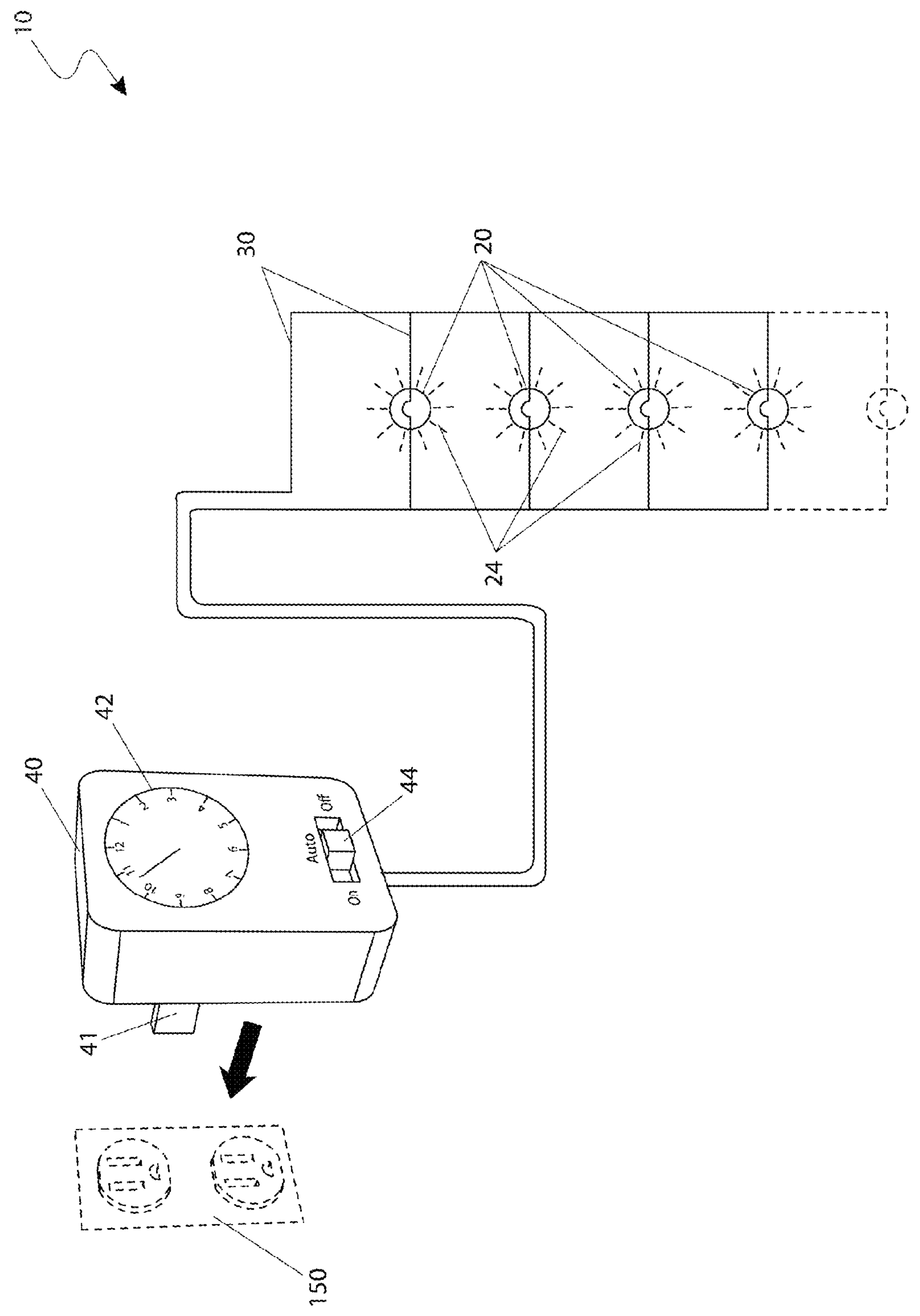
FIG. 3 is an electrical block diagram of the under-bed mounted night light 10, according to a preferred embodiment of the present invention.

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for an under-bed mounted night light (herein described as the "apparatus") 10, which provides an accent lighting apparatus comprising a plurality of lamps 20, preferably being light-emitting diodes (LED's), which are automatically activated by a timer 40 which plugs into a standard wall outlet 150. The lamps 20 are mounted along a bed frame 100 to provide soft illumination 24 from underneath a bed 100. The lamps 20 are electrically interconnected along common wiring 30 and adhesively attached 22 thereto the bed frame 110.

Referring now to FIG. 1, an environmental view of the apparatus 10, according to the preferred embodiment of the present invention, is disclosed. The apparatus 10 provides an attachment means therebetween the lamps 20 and the bed frame 110 being adhesively affixed thereto lower horizontal surfaces of said bed frame 110 using corresponding adhesive tabs 21. The lamps 20 direct the produced illumination 24 downward thereto a floor area surrounding the bed 100, thereby producing enhanced visibility for walking, comforting illumination for children, a romantic effect, and/or other attractive and decorative lighting effects.

The apparatus 10 comprises a plurality of lamps 20, various interconnecting wiring 30, and a timer module 40. The lamps 20 preferably comprise miniature LED type bulbs; however, other types of illumination devices may be utilized with equal benefit such as, but not limited to: incandescent, xenon, or other current technologies. It is understood that the lamps 20 would be introduced in a variety of colors to produce different illuminating effects within a room. Said lamps 20 are to be arranged in an equally-spaced manner along a common copper wire 30 forming a parallel circuit similar thereto common ornamental and holiday lighting. It is also envisioned that the apparatus 10 would be introduced in different lengths, thereby corresponding thereto various bed 100 sizes such as single, double, queen, and the like.

The timer module 40 provides automatic and manual activation of the lamps 20. Automatic activation of the lamps 20 may be accomplished based upon user selected time periods being manually preset using the dial 42. Activation periods are envisioned to include events such as, but not limited to: bed times, dawning hours, and other periods of a day in which a user may be active during naturally dark periods. The timer module 40 comprises a conventional commercially available timer unit comprising expected features including a rectangular plastic housing having integral male plug prongs 41 along a rear surface for direct insertion thereinto a normal wall outlet 150, a settable dial 42 along a front surface being capable of mechanically or electronically defining multiple activation periods over a twenty-four (24) hour day, and a three-position mode switch 44 and corresponding indicia indicating "ON", "AUTO", and "OFF" functions. Selection of the "AUTO" mode provides automatic operation of the apparatus 10 during said preset time intervals. Manual selection of the "ON" mode portion of the mode switch 44 provides immediate continuous illumination 24 of the lamps. Manual selection of the "OFF" mode disables activation of the lamps 20 until a change in mode selection takes place (see FIG. 3).

Referring now to FIGS. 2*a* and 2*b*, environmental and close-up views of a lamp portion 20 of the apparatus 10, according to the preferred embodiment of the present invention, are disclosed. The apparatus 10 comprises an adhesive tab 21. The adhesive tab 21 further comprises a length of heat-resistant plastic or paper tape approximately one (1) inch long forming an adhesively bonded loop which encompasses the wiring 30 and the lamp 20. The adhesive tab 21 also comprises a centrally located aperture 25 allowing said lamp 20 to extend therethrough, thereby directing the illumination 24 towards a floor surface. The adhesive tab 21 also comprises an adhesive layer 22 along one (1) side and a correspondingly shaped layer of release liner 23 made using common wax or silicone coated paper to protect the adhesive layer portion 22 of the adhesive tab 21. It is further understood that attachment of the adhesive tab 21 thereto the wiring 30 is not limited to the illustrated embodiment shown here, and a person skilled in the art will appreciate that many other attachment methods and designs are possible without deviating from the basic concept and as such should not be interpreted as a limiting factor of the apparatus 10.

In use, the release liner 23 is stripped away from the adhesive layer 22 of each adhesive tab 21. Each adhesive tab 21 is then pressed and secured therealong a bottom horizontal surface of the bed frame 110.

Referring now to FIG. 3, an electrical block diagram of the apparatus 10, according to a preferred embodiment of the present invention, is disclosed. Electrical power is supplied thereto the apparatus 10 by insertion of the plug prong portions 41 of the timer module 40 thereinto a common household outlet 150. Said power is then routed therethrough the mode switch 44 comprising a common three-position sliding switch which provides automatic or manual activation of the lamps 20. Automatic activation of the lamps 20 is based upon the preset time periods as indicated on the dial 42. Manual activation of the lamps 20 results from a user selection of the "ON" position of the mode switch 44. Activation of the lamps 20 initiates an output current flow thereto the wiring 30 and connected lamps 20. It is envisioned that the wiring 30 and lamps 20 would be arranged in a parallel circuit so as to allow a single lamp 20 to become defective without affecting any remaining lamps 20 of the apparatus 10 in a similar manner as popular decorative lighting units common in the industry.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2*a*.

The method of installing and utilizing the apparatus 10 may be achieved by performing the following steps: procuring a model of the apparatus 10 which provides a desired length and lighting color scheme based upon an anticipated bed size and desired lighting effect; selecting one (1) lamp 20, being located thereat a distal end portion of the wiring 30, thereto a bed frame portion 110 being furthest away from the wall outlet 150; affixing said lamp 20 by peeling the release liner 23 away from the adhesive tab 21; pressing the adhesive tab 21 against a bottom horizontal surface of the bed frame 150 so as to direct the anticipated illumination 24 towards a floor surface; continuing to apply subsequent lamps 20 in like manner while progressing along the bed frame 150 until finally attaching the last lamp 20, being located thereat the proximal end of the wiring 30 relative to the timer module 40; inserting the plug prong portions 41 of the timer module 40 thereinto a wall outlet 150; setting one (1) or more time intervals in which to activate the lamps 20 using the dial 42; moving the mode switch 44 thereto the "AUTO" position for automatic operation, thereto the "ON" position to immediately initiate the lamps 20, or thereto the "OFF" position to disable the lamps 20 until needed; and, benefiting from improved night-time safety while enjoying various subtle lighting effects along a perimeter region of a bed 100 while utilizing the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An illuminating means, comprising:
- a light string, further comprising an electrical wire and a plurality of equidistantly-spaced illuminating lamps in electrical communication with said light string; and,
- a plurality of adhesive tabs for removably bonding said light string to a support structure, each comprising:
  - a length of heat-resistant tape, forming an adhesively bonded loop and further comprising a first side and a second side;
  - a lamp aperture located on said first side; and,
  - an adhesive bonding material coextensive with said second side having a removable backing;
- wherein each of said plurality of adhesive tabs encompasses a portion of said light string and one of said plurality of lamps;
- wherein said one of said plurality of lamps extends outward through said aperture;
- wherein said removable backing provides access to said adhesive bonding material for removably bonding to said support structure; and,
- wherein said light string is in electrical communication with a power source.

2. The illuminating means of claim 1, wherein said illuminating means provide visual illuminating effects within a room.

3. The illuminating means of claim 2, wherein said light string is mounted to said support structure such that said visual illuminating effects are directed downward thereto a floor area surrounding said support structure, thereby producing an enhanced visibility.

4. The illuminating means of claim 1, wherein said plurality of lamps further comprises miniature LED bulbs.

5. The illuminating means of claim 1, further comprising a timer module in electrical communication with said light string, thereby providing automatic and manual activation of said plurality of lamps.

6. The illuminating means of claim 5, wherein said timer module further comprises a housing having integral male plug prongs along a rear surface for direct insertion into an electrical outlet, a dial along a front surface defining multiple activation periods over a twenty-four (24) hour day, a three-position mode switch and corresponding indicia indicating an "ON" function, an "AUTO" function, and an "OFF" function;
- wherein said dial is selectively set to a desired pre-set time interval;
- wherein said "ON" function provides immediate and continuous power to said light string;
- wherein said "AUTO" function provides automatic operation of said light string at said desired pre-set time interval; and,
- wherein said "OFF" function ceases power to said light string.

7. The illuminating means of claim 1, wherein said support structure is a lower surface of a bed frame.

8. An illuminating means attachable to a lower surface of a bed frame, comprising:
- a light string, further comprising an electrical wire and a plurality of equidistantly-spaced illuminating lamps in electrical communication with said light string;
- a plurality of adhesive tabs for removably attaching said light string to said bed frame, each further comprising:
  - a length of heat-resistant tape, forming an adhesively bonded loop and further comprising a first side and a second side;
  - a lamp aperture located on a first side; and,
  - an adhesive bonding material coextensive with said second side having a removable backing; and,
- a timer module in electrical communication with said light string, further comprising:
  - a housing having integral male plug prongs along a rear surface for direct insertion into an electrical outlet;
  - a dial along a front surface defining multiple activation periods over a twenty-four (24) hour day; and,
  - a three-position mode switch and corresponding indicia indicating an "ON" function, an "AUTO" function, and an "OFF" function;

wherein each of said plurality of adhesive tabs encompasses a portion of said light string and one of said plurality of lamps;

wherein said one of said plurality of lamps extends outward through said aperture;

wherein said removable backing provides access to said adhesive bonding material for removably bonding to said support structure wherein said dial is selectively set to a desired pre-set time interval;

wherein said "ON" function provides immediate and continuous power to said light string;

wherein said "AUTO" function provides automatic operation of said light string at said desired pre-set time interval;

wherein said "OFF" function ceases power to said light string; and, wherein said light string is in electrical communication with a power source.

9. The illuminating means of claim 8, wherein said illuminating means provide visual illuminating effects within a room.

10. The illuminating means of claim 9, wherein said light string is mounted to said support structure such that said visual illuminating effects are directed downward thereto a floor area surrounding said support structure, thereby producing an enhanced visibility.

11. The illuminating means of claim 8, wherein said plurality of lamps further comprises miniature LED bulbs.

12. The illuminating means of claim 8, wherein said plurality of adhesive tabs each further comprises:

a length of heat-resistant tape, forming an adhesively bonded loop and further comprising a first side and a second side;

a lamp aperture located on a first side; and, an adhesive bonding material coextensive with said second side having a removable backing;

wherein each of said plurality of adhesive tabs encompasses a portion of said light string and one of said plurality of lamps;

wherein said one of said plurality of lamps extends outward through said aperture; and, wherein said removable backing provides access to said adhesive bonding material for removably bonding to said support structure.

13. A method of illuminating a floor underneath a bed comprises the following steps:

providing an illuminating means, further comprising:

a light string comprising an electrical wire and a plurality of equidistantly-spaced illuminating lamps in electrical communication with said light string; and, a plurality of adhesive tabs, each comprising a length of heat-resistant tape, forming an adhesively bonded loop and further comprising a first side and a second side, a lamp aperture located on a first side, and an adhesive bonding material coextensive with said second side having a removable backing;

routing said light string through a desired amount of said plurality of adhesive tabs, ensuring each of said plurality of lamps extends outward through said aperture of each of said desired amount of adhesive tabs;

removing said backing of each of said plurality of adhesive tabs, thereby revealing said adhesive bonding material;

bonding said second side to desired locations of said bed frame; and, supplying power to said light string and said plurality of lamps, thereby providing a visual illuminating effect.

14. The method of claim 13, further comprising the step of ensuring each of said plurality of lamps is directed downward, thereby directing said visual illuminating effects to a ground underneath said bed frame.

15. The method of claim 13, further comprising the steps of:

electrically connecting a timer module to said light string, said timer module further comprising a housing having integral male plug prongs along a rear surface for direct insertion into an electrical outlet, a dial along a front surface defining multiple activation periods over a twenty-four (24) hour day and, a three-position mode switch and corresponding indicia indicating an "ON" function, an "AUTO" function, and an "OFF" function;

determining a desired pre-set interval for activating said light string;

setting said desired pre-set interval on said dial; and, setting said mode switch to said "AUTO" function, thereby providing said visual illuminating effects at said desired pre-set time.

16. The method of claim 15, further comprising the step of setting said mode switch to said "ON" function, thereby providing continuous power to said light string.

17. The method of claim 15, further comprising the step of setting said mode switch to said "OFF" function, thereby interrupting power to said light string.

* * * * *